(12) United States Patent
Koster et al.

(10) Patent No.: US 6,722,033 B2
(45) Date of Patent: Apr. 20, 2004

(54) PALLET ASSEMBLY FOR ASSEMBLING A FIBER OPTIC MODULE THAT INCLUDES A HOUSING

(75) Inventors: Keith Douglas Koster, Tustin, CA (US); Robert Heitel, Laguna Beach, CA (US); Jiansheng Zhou, Cerritos, CA (US)

(73) Assignee: Newport Corporation, Irvine, CA (US)

( * ) Notice: Subject to any disclaimer, the term of this patent is extended or adjusted under 35 U.S.C. 154(b) by 70 days.

(21) Appl. No.: 09/973,126

(22) Filed: Oct. 8, 2001

(65) Prior Publication Data

US 2003/0066191 A1 Apr. 10, 2003

(51) Int. Cl.⁷ ................................................ H01R 43/04
(52) U.S. Cl. .............................. 29/861; 29/862; 29/857; 29/760; 156/350
(58) Field of Search .................... 29/861, 862, 857, 29/760, 784, 799, 33 M, 564.1, 564.8; 156/350, 353, 358, 359; 269/71, 103, 149

(56) References Cited

U.S. PATENT DOCUMENTS

| | | | |
|---|---|---|---|
| 4,890,715 A | | 1/1990 | Sticht |
| 4,914,797 A | | 4/1990 | Tsuchida et al. |
| 4,944,079 A | * | 7/1990 | Nakamura et al. .......... 26/33 M |
| 4,947,335 A | | 8/1990 | Blitchington |
| 5,074,021 A | | 12/1991 | Feng et al. |
| 5,340,371 A | | 8/1994 | Dyott |
| 5,434,790 A | | 7/1995 | Saka et al. |
| 5,653,894 A | | 8/1997 | Ibbotson et al. |
| 5,654,903 A | | 8/1997 | Reitman et al. |
| 5,695,331 A | | 12/1997 | Nutter et al. |
| 5,724,723 A | * | 3/1998 | Saliba et al. ................... 29/754 |
| 5,745,987 A | | 5/1998 | Bartley et al. |
| 5,770,001 A | * | 6/1998 | Nagayama et al. ......... 156/350 |
| 5,857,049 A | | 1/1999 | Beranek et al. |
| 6,056,447 A | | 5/2000 | Caras |
| 6,078,845 A | | 6/2000 | Freidman |
| 6,099,392 A | * | 8/2000 | Wiegand et al. ............... 451/41 |
| 6,240,398 B1 | | 5/2001 | Allen et al. |

* cited by examiner

Primary Examiner—Carl J. Arbes
Assistant Examiner—Tim Phan
(74) Attorney, Agent, or Firm—Irell & Manella LLP

(57) ABSTRACT

Apparatuses and methods for automating the assembly of a fiber optic module. The fiber optic module typically includes a housing, a clip, and a ferrule that is attached to the end of a fiber optic cable. The housing, clip, ferrule and fiber optic cable are supported by a pallet assembly. The pallet assembly can be loaded into a docking station of a laser weld machine that welds the ferrule to the clip. The pallet assembly includes a cartridge that is attached to a pallet and supports the housing. The pallet is constructed to receive different cartridges. Each cartridge has support features that correspond to a specific type of module housing. A different type of module housing may be loaded onto the pallet assembly by merely replacing the cartridge. The same pallet can therefore be used for the assembly of different fiber modules.

42 Claims, 15 Drawing Sheets

PALLET ASSEMBLY FOR ASSEMBLING A FIBER OPTIC MODULE THAT INCLUDES A HOUSING

BACKGROUND OF THE INVENTION

1. Field of the Invention

The present invention relates to pallets and workstations for assembling fiber optic modules.

2. Background Information

Fiber optic networks typically contain a number of optical fibers interconnected by various routers, computers, switches, etc. Information is transmitted through the fibers by photo-emitters such as laser diodes. The laser diodes emit light that travels through the fiber to a photo-detector.

The end of an optical fiber is typically coupled to the photo-emitter or photo-detector in an electronic package sometimes referred to as a fiber optic module. The package typically contains a platform that supports the emitter/detector and an outer metal housing to protect the optical components. The housing has an aperture that receives the end of the fiber. A metal sleeve, otherwise known as a ferrule, is attached to the end of the fiber and then welded to the package housing, or a metal clip mounted to the housing platform. It is critical to accurately align the fiber with the emitter/detector to minimize the optical power losses in the system.

The ferrule is typically welded to the package with one or more lasers of a laser weld machine. The laser weld machine has tooling fixtures that hold the package and ferrule in place during the weld process. The tooling fixtures are typically custom built for each type of fiber optic module assembly. Producing a different type of fiber module typically requires shutting down the assembly line and re-tooling the workstations of the line. It would be desirable to provide tooling that would allow for a change in fiber modules without shutting down the line.

The ferrule and fiber optic cable is inserted through a snout of the module housing before being welded to the clip. Inserting the ferrule through the housing snout can be a time consuming process similar to threading a needle. It would be desirable to automate the process of inserting the ferrule through the housing snout to reduce the time required to assemble the module. Additionally, it would be desirable to further standardize and automate the process of assembling fiber optic modules.

BRIEF SUMMARY OF THE INVENTION

A pallet assembly for assembling a fiber optic module that includes a housing. The assembly includes a cartridge that can support the housing and is attached to a pallet.

DETAILED DESCRIPTION

Disclosed are apparatuses and methods for automating the assembly of a fiber optic module. The fiber optic module typically includes a housing, a clip, and a ferrule that is attached to the end of a fiber optic cable. The housing, clip, ferrule and fiber optic cable are supported by a pallet assembly. The pallet assembly can be loaded into a docking station of a laser weld machine that welds the ferrule to the clip. The pallet assembly includes a cartridge that is attached to a pallet and supports the housing. The pallet is constructed to receive different cartridges. Each cartridge has support features that correspond to a specific type of module housing. A different type of module housing may be loaded onto the pallet assembly by merely replacing the cartridge. The same pallet can therefore be used for the assembly of different fiber modules. This minimizes the tooling cost and change-over time associated with manufacturing different types of modules. The ferrule can be loaded into the housing with a self-aligning gripper assembly. The self-aligning process is automated to reduce the time and cost associated with manufacturing a module. The docking station of the laser weld machine may have features that more fully automate the docking and welding processes.

Figure 1:
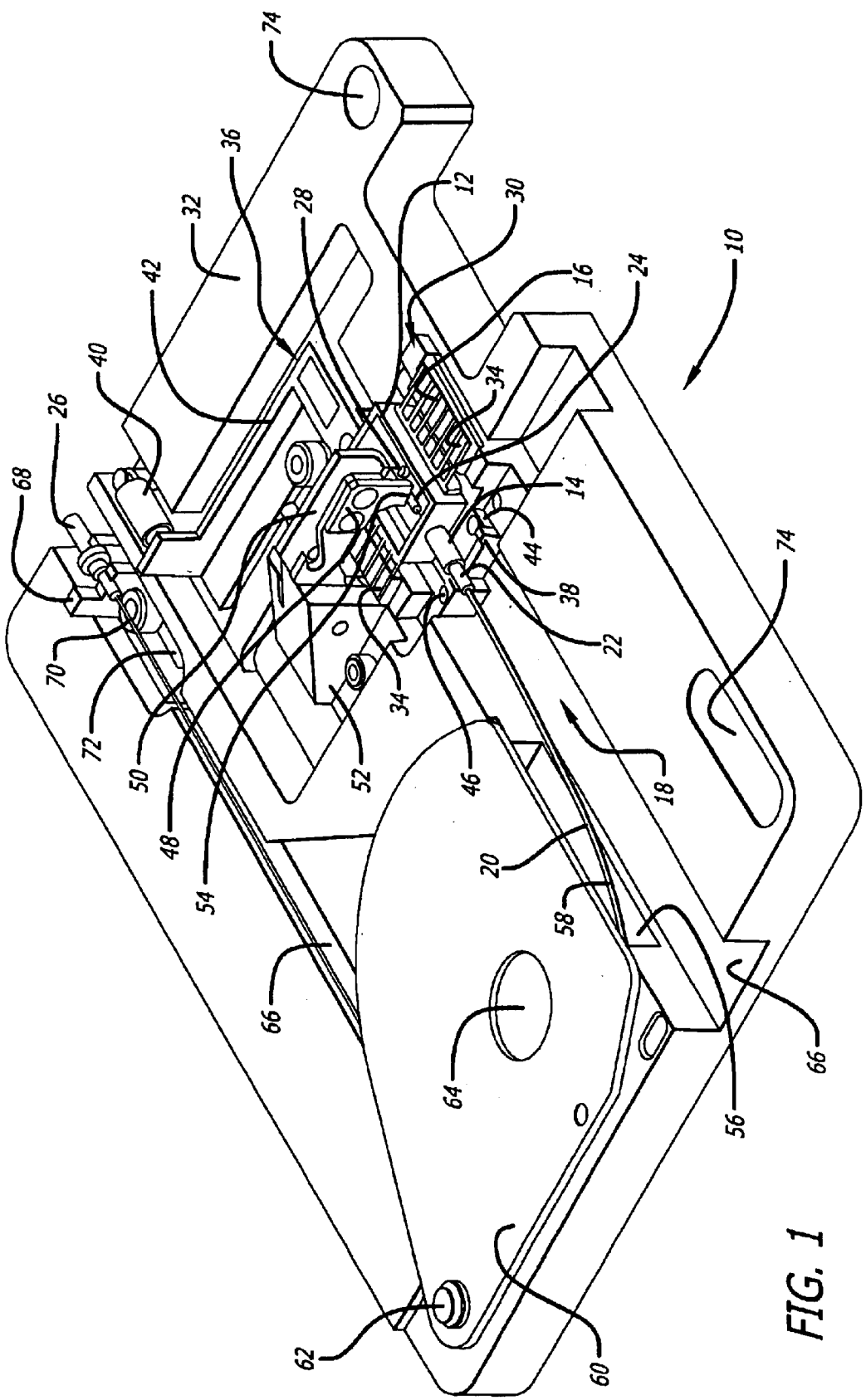
FIG. 1 is a top side perspective view of a pallet assembly.

Referring to the drawings more particularly by reference numbers, FIG. 1 shows a pallet assembly 10. The pallet assembly 10 may support various components of a fiber optic module during assembly of the module. The module components include a housing 12 that has a snout 14 and a plurality of electrical leads 16. Such a configuration is commonly referred to as a "butterfly" package. A fiber optic cable assembly 18 is coupled to the housing 12 in the assembly process. The cable assembly 18 includes a fiber optic cable 20 that is attached at one end to a pair of ferrules 22 and 24, and terminates at the other end with a connector 26. The ferrule 22 is typically soldered to the housing snout 14. The other ferrule 24 is welded to a clip 28 located within the housing 12.

The pallet assembly 10 includes a cartridge 30 that supports the housing 12 and is attached to a pallet 32. The cartridge 30 includes a pair of ledges 34 to support the leads 16. The pallet assembly 10 may includes a spring loaded swing arm assembly 36 that pushes the housing 12 into a pair of stops 38 on the cartridge 30. The swing arm assembly 36 may include a spring 40 that is attached to a swing arm 42 and the pallet 32. The spring 40 exerts a force through the swing arm assembly 36 that biases the housing 12 into the stops 38. The swing arm assembly 36 secures the housing 12 within the pallet assembly 10 in both lateral, and perpendicular directions. The stops 38 may have angled surfaces 44 to compensate for tolerances in the housing 12, and also lock the housing against the floor of cartridge 30. The spring biased swing arm 42 allows housings 12 of different sizes to be loaded onto the cartridge 30. The swing arm 42 also self-compensates for tolerances in the housings 12.

The cartridge 30 can be coupled to the pallet 32 with pins 46. The dimensions of the stops 38, ledges 34, etc. of the cartridge 30 are configured to support a specific type of module housing 12. The pallet assembly 10 can be modified to support a different type of housing 12 by replacing the cartridge 30 with a new cartridge that is configured to support the different module housing. The pallet assembly 10 thus provides a cartridge feature that allows the assembly 10 to be adapted to various types of module housings 12, without replacing the entire pallet 32. This reduces the cost of producing the fiber module pallet tooling. Without a cartridge 30 the manufacturer would have to create and store pallets for each type of module.

The pallet assembly 10 may further include a ferrule arm 48 and a clip arm 50 pivotally attached to an arm mount 52. The ferrule arm 48 may include a compliant slot 54 that receives and holds the ferrule 24. The clip arm 50 may hold the clip 28 in place. The arms 48 and 50 may be manually moved from an open position, to the closed position shown in FIG. 1. The arms 48 and 50 can hold the ferrule 24 and clip 28 during a weld process.

The pallet 32 may have a pocket 56 that supports a coiled portion 58 of the fiber optic cable 20. The coiled fiber 58 may be secured by a cover 60 that encloses the pocket 56. The cover 60 can be rotated between open and closed positions about a pin 62. The pocket cover 60 may include a finger hole 64 to facilitate opening of the cover 60.

The pallet 32 may further have a pair of channels 66 that support portions of the fiber optic cable 20. The channels 66 and pocket 56 prevent undesirable movement of the fiber optic cable 20 when the pallet assembly 10 is transported to an assembly station.

The pallet assembly 10 may include a shuttle 68 that supports the cable connector 26. The shuttle 68 is coupled to the pallet 32 by a screw 70 located within slot 72. The shuttle 68 can slide relative to the pallet 32 to allow automatic loading of the connector 26 to a photodetector (not shown). The pallet 32 may further have alignment apertures 74 to allow alignment with a docking station.

Figure 2:
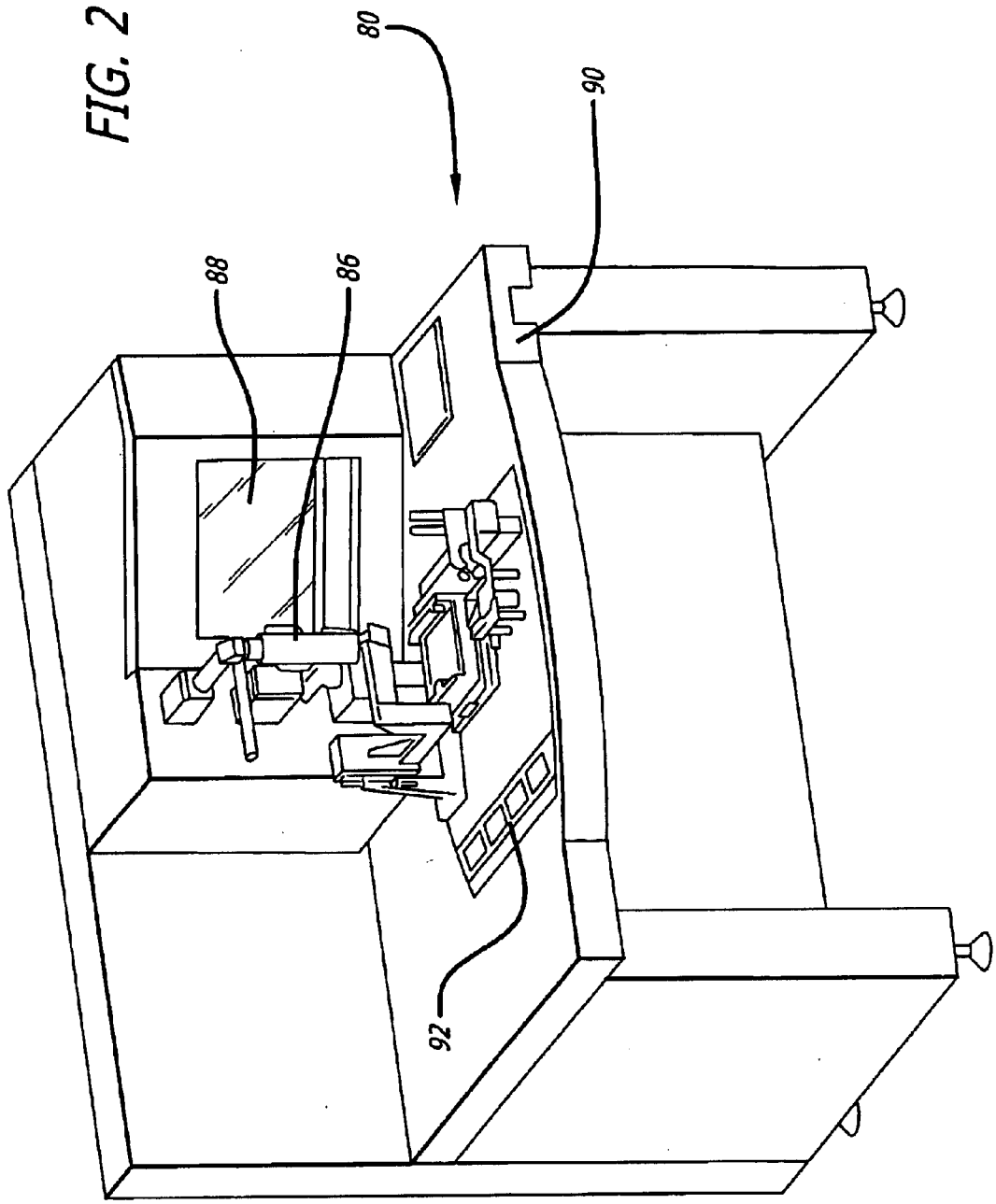
FIG. 2 is a front top perspective view of a pallet loader station.
Figure 3:
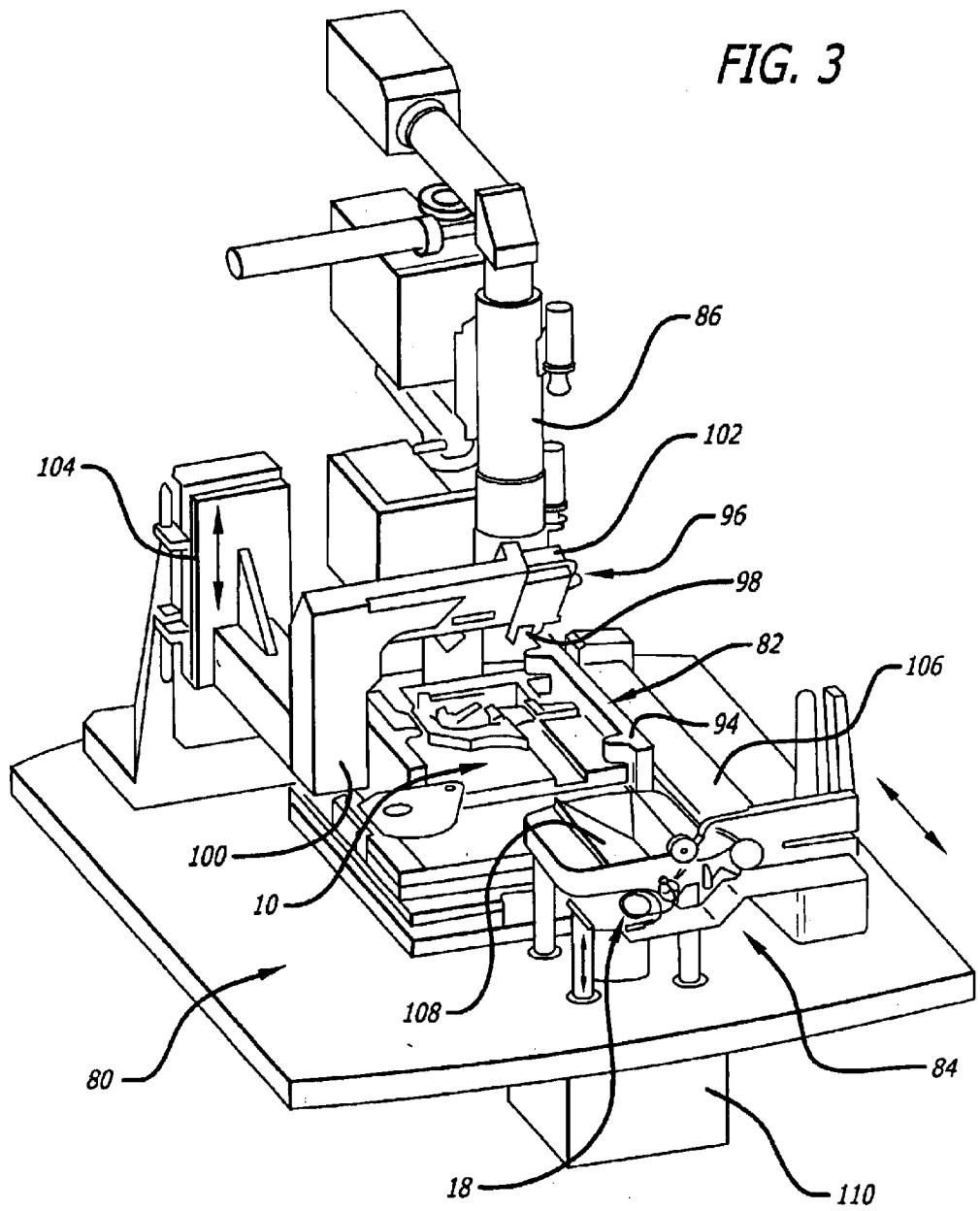
FIG. 3 is a front perspective view of a pallet station and gripper assembly of the pallet loader station.

FIGS. 2 and 3 show a pallet loader station 80 for loading the fiber optic cable assembly 18 onto the pallet assembly 10. The pallet loader station 80 includes a pallet station 82 and a gripper assembly 84. The pallet station 82 may include a camera 86 that is coupled to a monitor 88. The camera 86 and monitor 88 allow an operator to view the loading process. The pallet station 82 and gripper assembly 84 may be mounted on a table 90 which has a control panel 92 that allows an operator to control the automated functions of the loader station 80.

The pallet station 82 may include a docking station 94 that receives and secures the pallet assembly 10. The station 82 may further include a pneumatic gripper assembly 96 that has a gripper 98 located at the end of a gripper arm 100. The gripper assembly 96 may include an actuator 102 that can move the gripper 98 between open and closed positions. The assembly 96 may further have an actuator 104 that moves the arm 100 up and down as indicated by the arrows.

The gripper assembly 84 may slide along a guide rail 106 to and from the pallet station 82 as indicated by the arrows. The gripper assembly 84 is located adjacent to a fiber guide tray 108. The fiber guide tray 108 is coupled to an actuator assembly 110 that can move the tray 108 up and down as indicated by the arrows.

Figure 4:
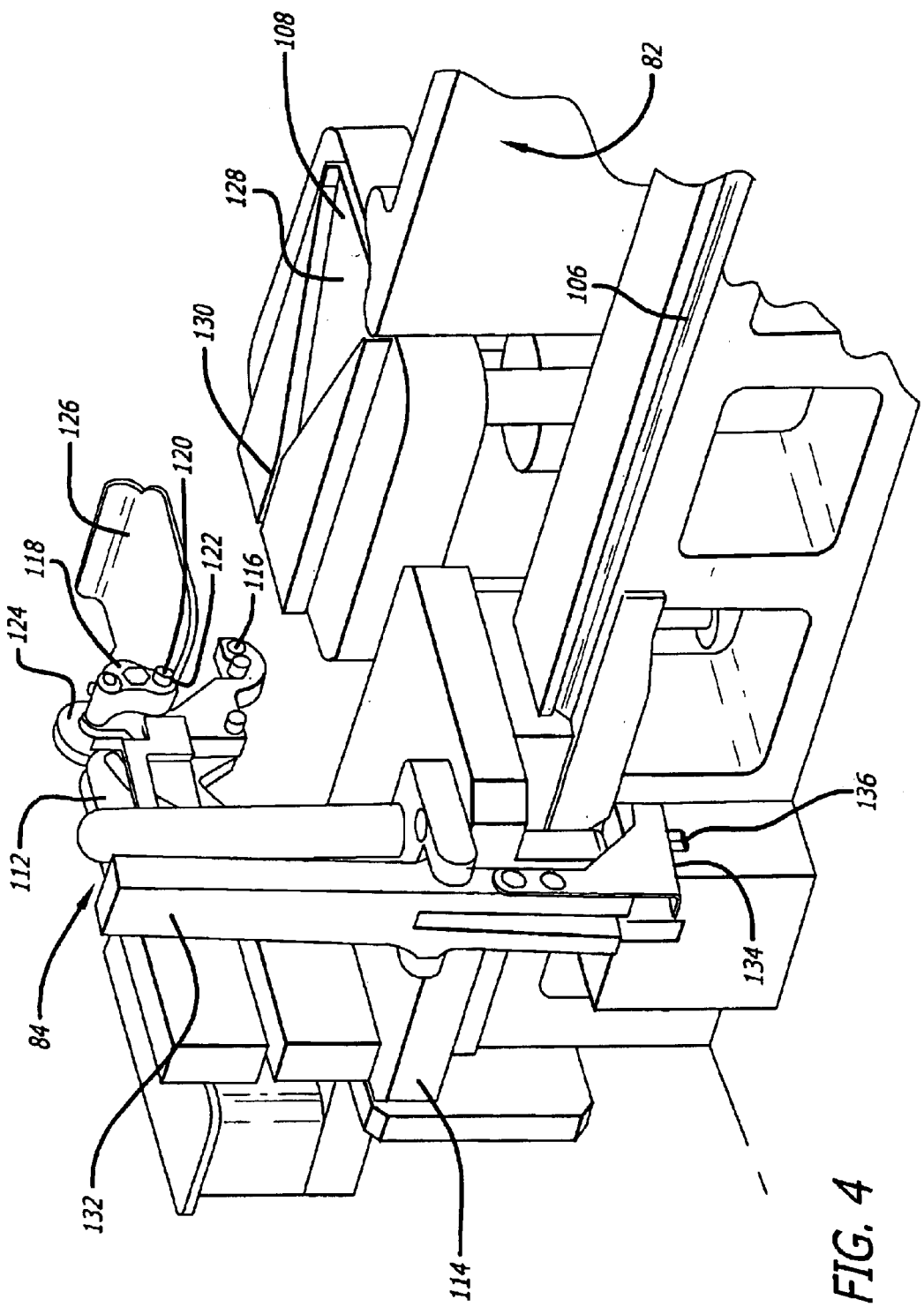
FIG. 4 is a rear perspective view of the gripper assembly.

As shown in FIG. 4, the gripper assembly 84 may include a gripper arm 112 that extends from a base 114 that can slide along the rail 106. The base 114 and rail 106 may have dovetail features that prevent tilting or rotation of the gripper assembly 84 during movement to and from the pallet station 82.

The gripper arm 112 may have a pair of idle rollers 116 that can support a fiber ferrule. The arm 112 may further have a locking arm 118 which has a locking roller 120 that can secure a fiber ferrule located on the idle rollers 116. The locking roller 120 may have a rubber band 122 that increases the friction of the roller surface. The locking arm 118 can be manually pivoted about the gripper arm 112 between opened and closed positions. The locking arm 118 may further have a rotating wheel 124 that can spin the locking roller 120 and rotate the ferrule. A support plate 126 may extend from the support arm 112 to support a fiber optic cable coil and connector (not shown).

The fiber guide tray 108 includes a tapered channel 128 that extends from a guide slot 130. The channel 128 and slot 130 can be used to align fiber ferrules with the gripper assembly 84.

The gripper assembly 84 may further include a safety handle 132 to reduce the possibilities of the operator being injured by the moving tray 108. The safety handle 132 has a flag 134 that is coupled to a stationary sensor 136. The sensor 136 may be an optical device that emits a light beam (not shown). The sensor 136, and actuator assembly 110 of the fiber guide tray 108 are coupled to electrical circuits (not shown) that will only allow the tray 108 to move when the gripper assembly 84 is pulled back to a home position, where the flag 134 is sensed by the sensor 136 and the operator depresses the handle 132. The tray 108 can then be moved by pushing a button on the control panel 92 of the loading station 80 (see FIG. 2). Depressing the handle 132 and pushing the panel button occupies both hands and thus reduces the possibility of the operator becoming injured by the moving tray 108.

Figure 5:
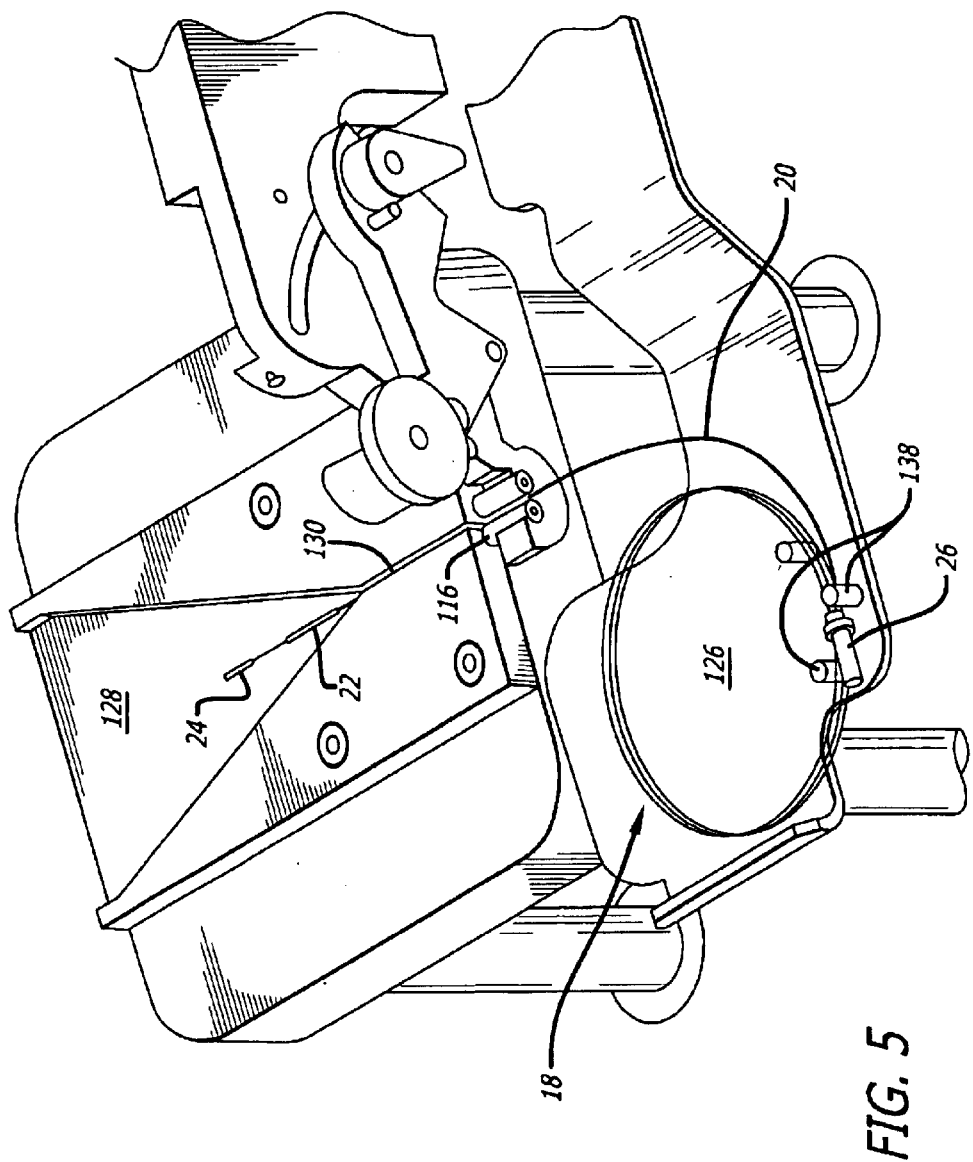
FIG. 5 is a top perspective view of the gripper assembly with a loaded fiber optic cable assembly.

Loading a fiber optic cable assembly onto the pallet assembly with the loader station 80 is shown in FIGS. 5–12. As shown in FIG. 5 a fiber optic cable assembly 18 is placed onto the support plate 126. The connector 26 is held by pins 138 that extend from the plate 126. The ferrules 22 and 24 are placed within the channel 128 and the fiber cable 20 is placed between the idle rollers 116. The operator may then pull the fiber cable 20 until the ferrule 22 is on top of the idle rollers 116. The guide slot 130 leads and aligns the ferrule 22 with the idle rollers 116. The pallet assembly 10 may be loaded into the pallet station 82, before, after, or during this process.

Figure 6:
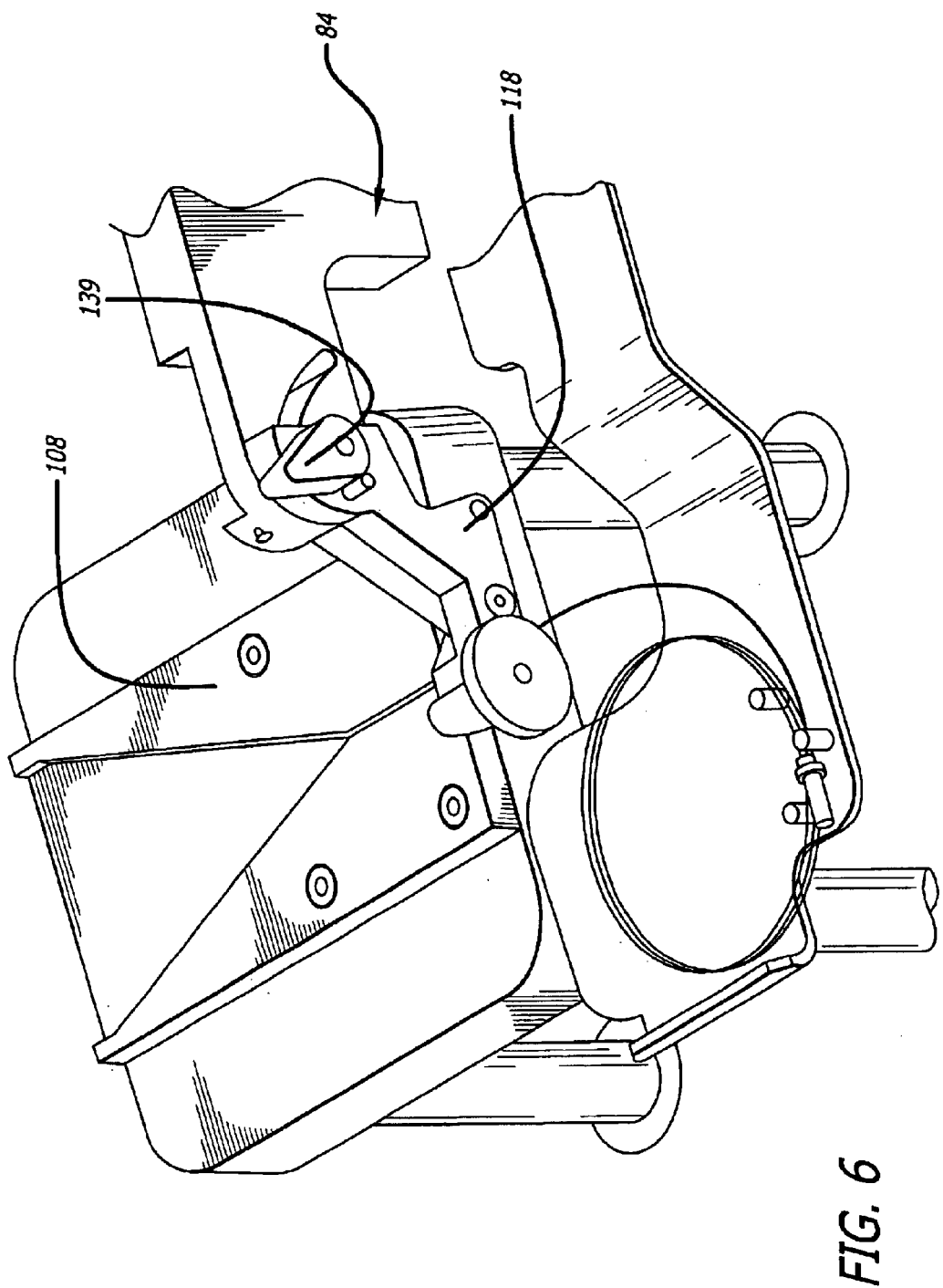
FIG. 6 is a top perspective view of the gripper assembly with a ferrule of the fiber optic cable assembly pulled through a guide tray and secured by a gripper.
Figure 7:
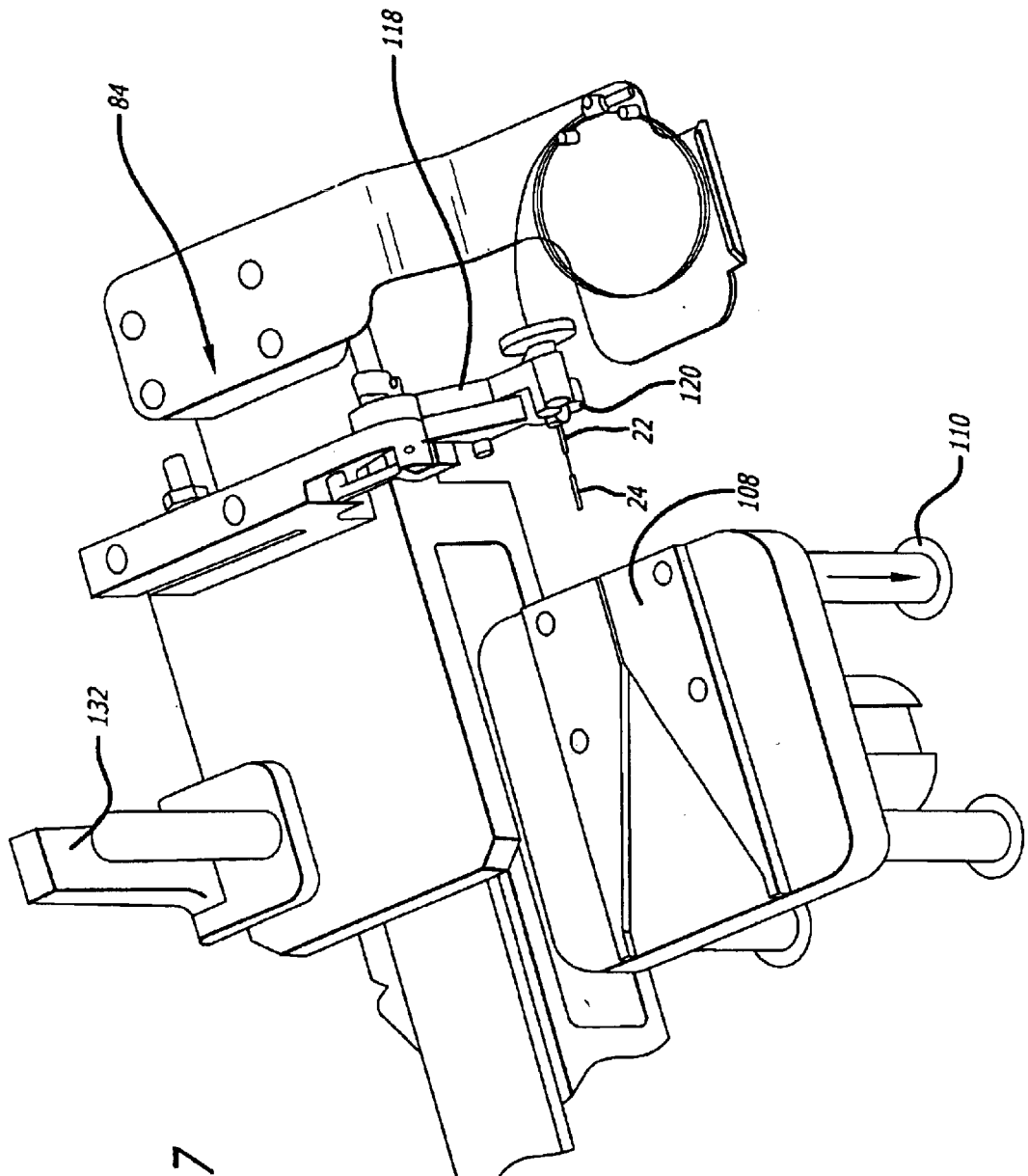
FIG. 7 is a side top perspective view of the gripper assembly with the gripper pulled to a home position.

As shown in FIGS. 6 and 7, the locking arm 118 is rotated to a locked position by actuating a cam lever 139. The gripper assembly 84 is then pulled back to a home position away from the tray 108. The locking roller 120 holds the ferrule 22 in place during movement of the gripper assembly 84 and the ferrules slide though the guide slot 130. While the gripper assembly 84 is in the home position, the operator can depress the safety handle 132 and actuate the tray actuator assembly 110 to move the tray 108 in a downward direction to provide clearance for the assembly 84.

Figure 8:
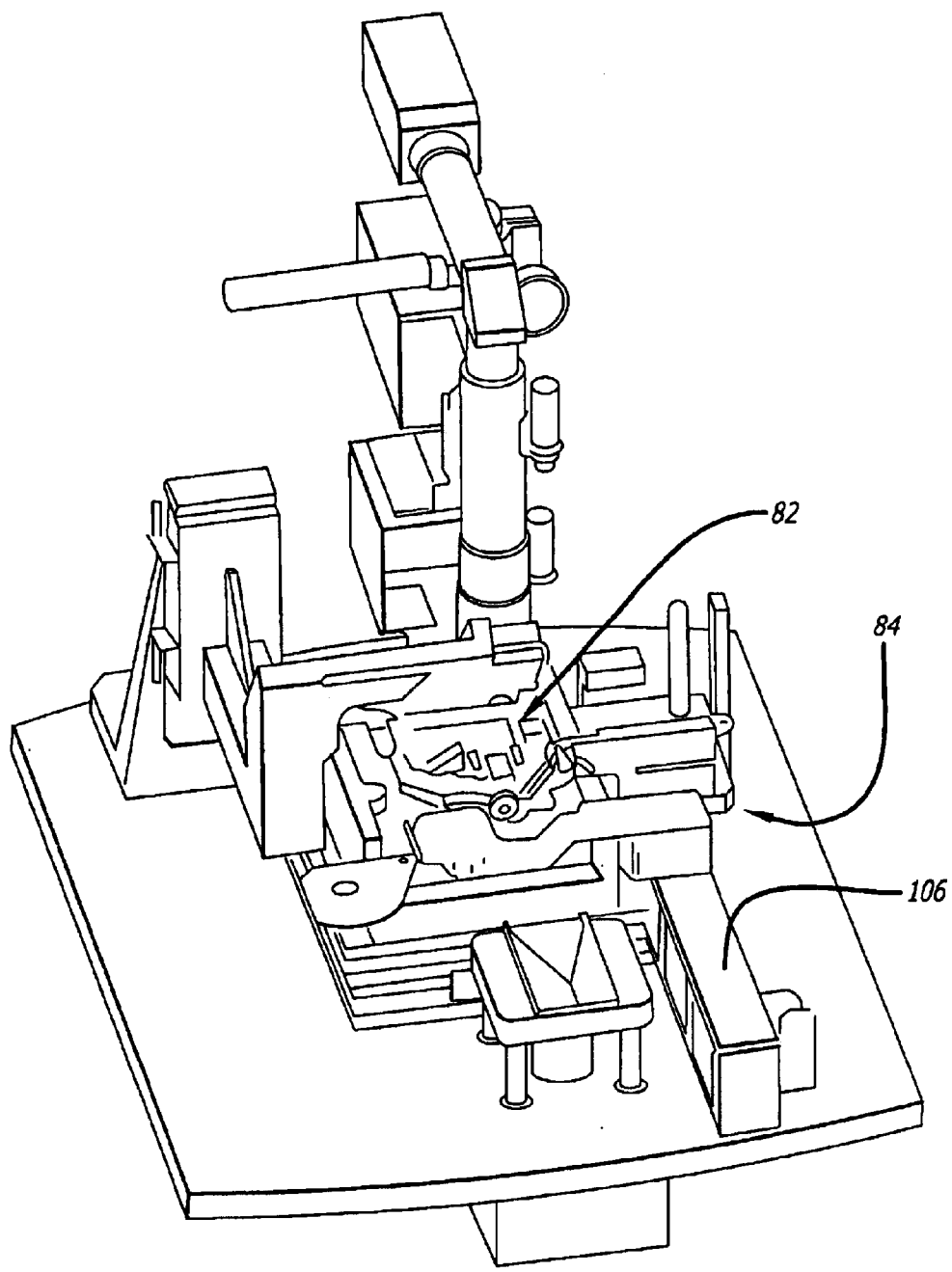
FIG. 8 is a front top perspective view of the pallet loader station with the gripper assembly moved to a load position.
Figure 9:
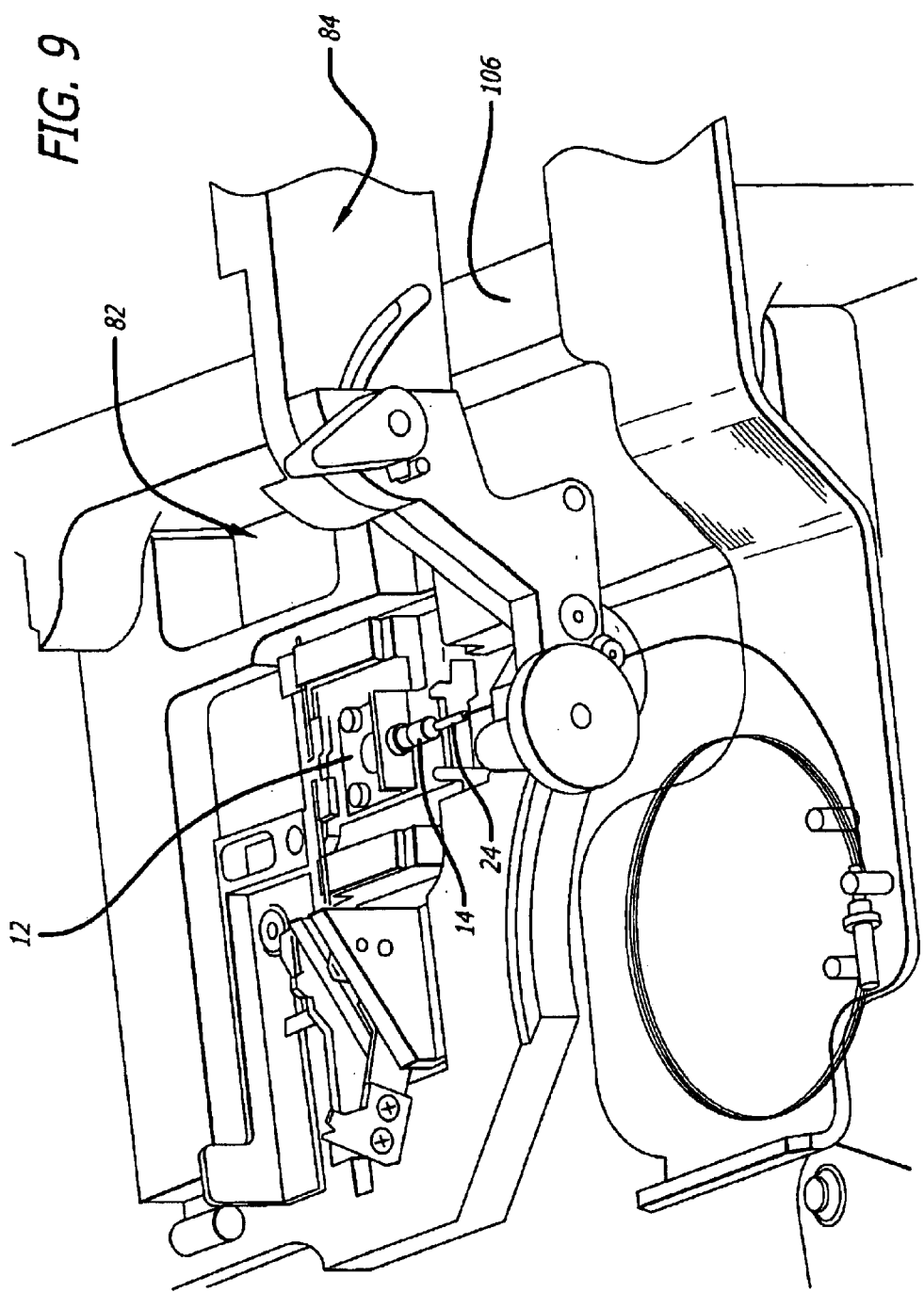
FIG. 9 is an enlarged top front perspective view of the pallet loader station showing the gripper assembly in the load position.

As shown in FIGS. 8 and 9, the gripper assembly 84 then moves along the rail 106 to a lock position in front of the pallet docking station 82. The pallet docking station 82, pallet assembly 10, gripper assembly 84 and rail 106 are configured so that further movement of the assembly 84 will push the ferrule 24 through the housing snout 14. The rail assembly 106 accurately aligns and translates the gripper assembly 84 so that the ferrule 24 is automatically inserted through the housing snout 14. This reduces the complexity and time associated with loading the fiber into the housing 12.

Figure 10:
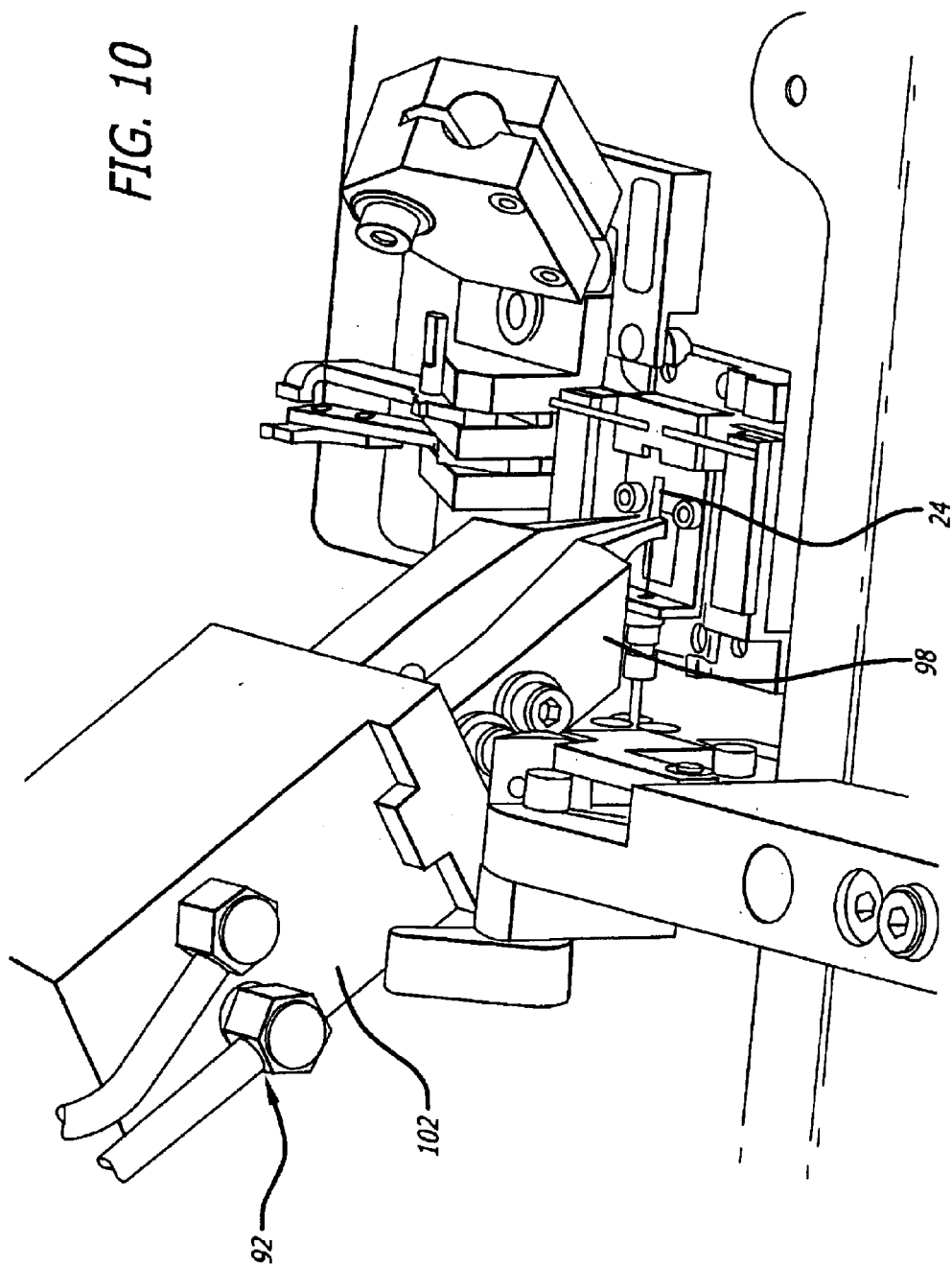
FIG. 10 is a side top perspective view showing a pneumatic gripper holding the ferrule.
Figure 11:
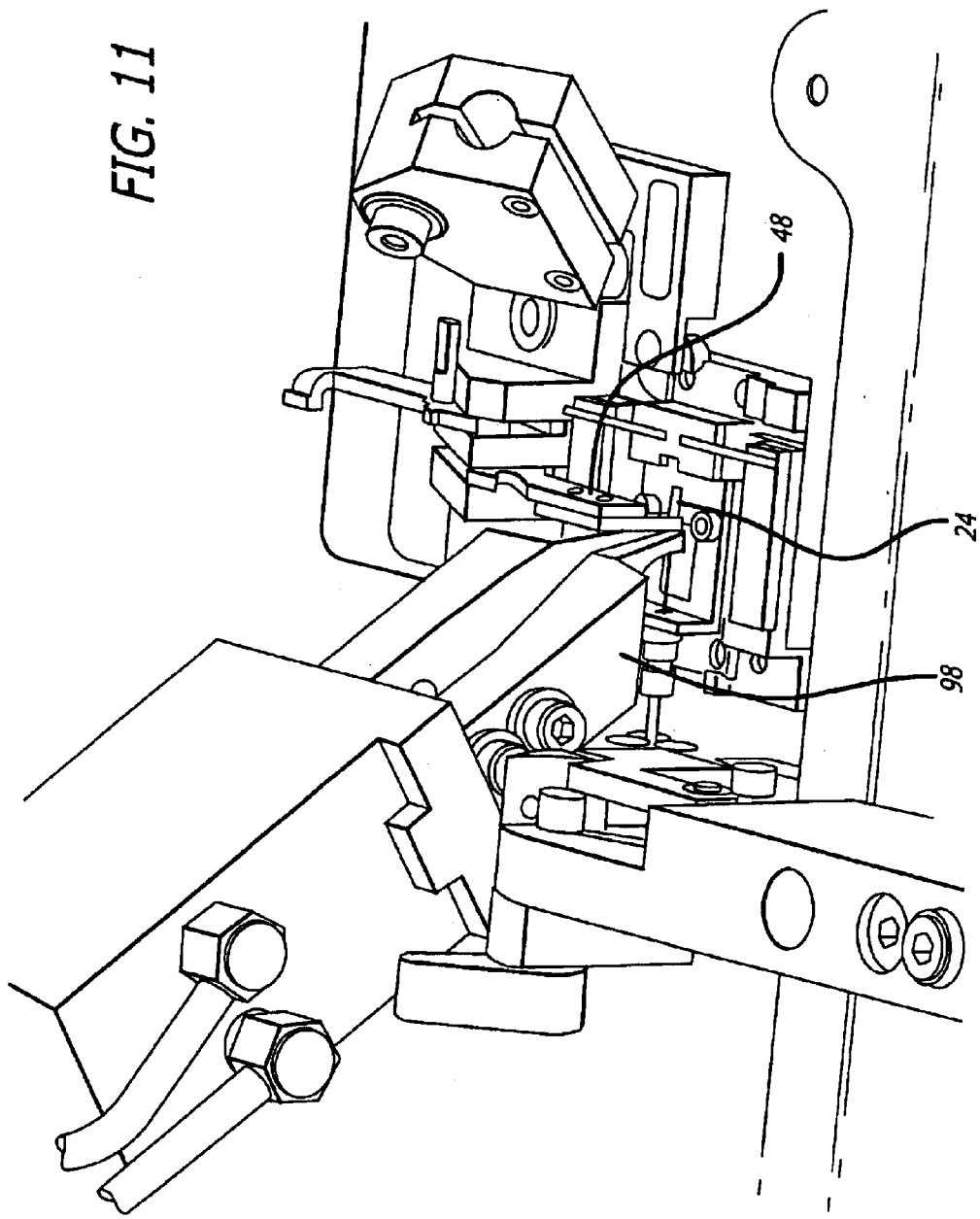
FIG. 11 is a side top perspective view showing a ferrule arm securing the ferrule.

As shown in FIG. 10, the pneumatic gripper assembly 96 is actuated to lower the gripper arm 100 and allow the gripper 98 to hold the ferrule 24. The ferrule arm 48 is then manually rotated to grasp the ferrule 24 as shown in FIG. 11. The gripper 98 can then release the ferrule 24 and move back to the up position. The operator can view the movement of the arm 48 through the camera 86 and monitor 88 of the station 80 (see FIG. 2). The operator may spin the rotating wheel (not shown) to rotate the ferrule 24 to the proper orientation within the housing 12, prior to grasping by the arm 48.

Figure 12:
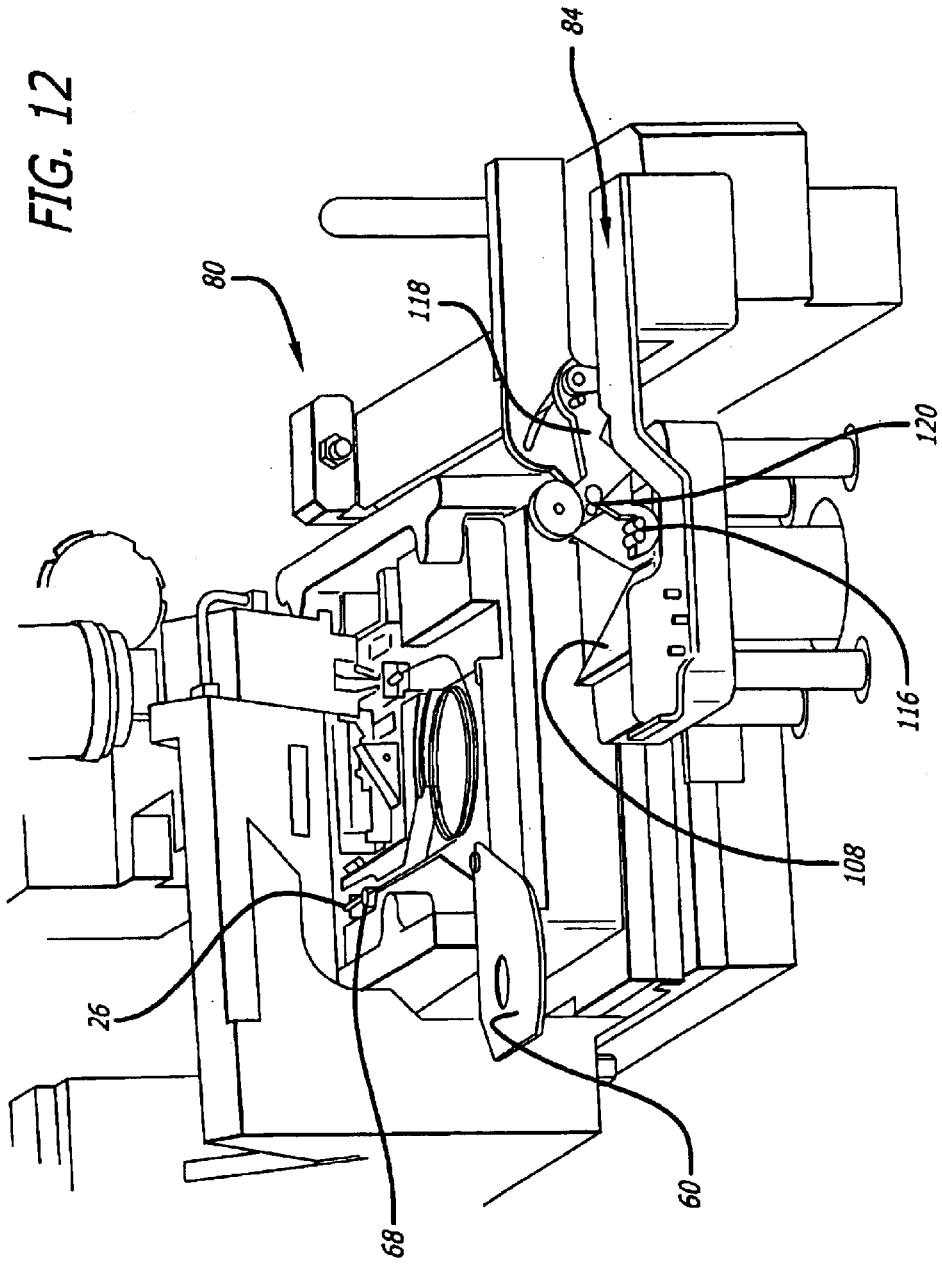
FIG. 12 is a front top perspective view of the pallet loader station showing the fiber optic cable assembly loaded onto the pallet assembly.

As shown in FIG. 12, the operator can release the locking roller 120 by rotating locking arm 118 back and away from idle rollers 116, then slide the gripper assembly 84 back to the original position and raise the tray 108 to the up position. The cable connector 26 can be placed onto the shuttle 68 and the pocket cover 60 may be pivoted to enclose the coiled fiber to complete the loading process within station 80.

Figure 13:
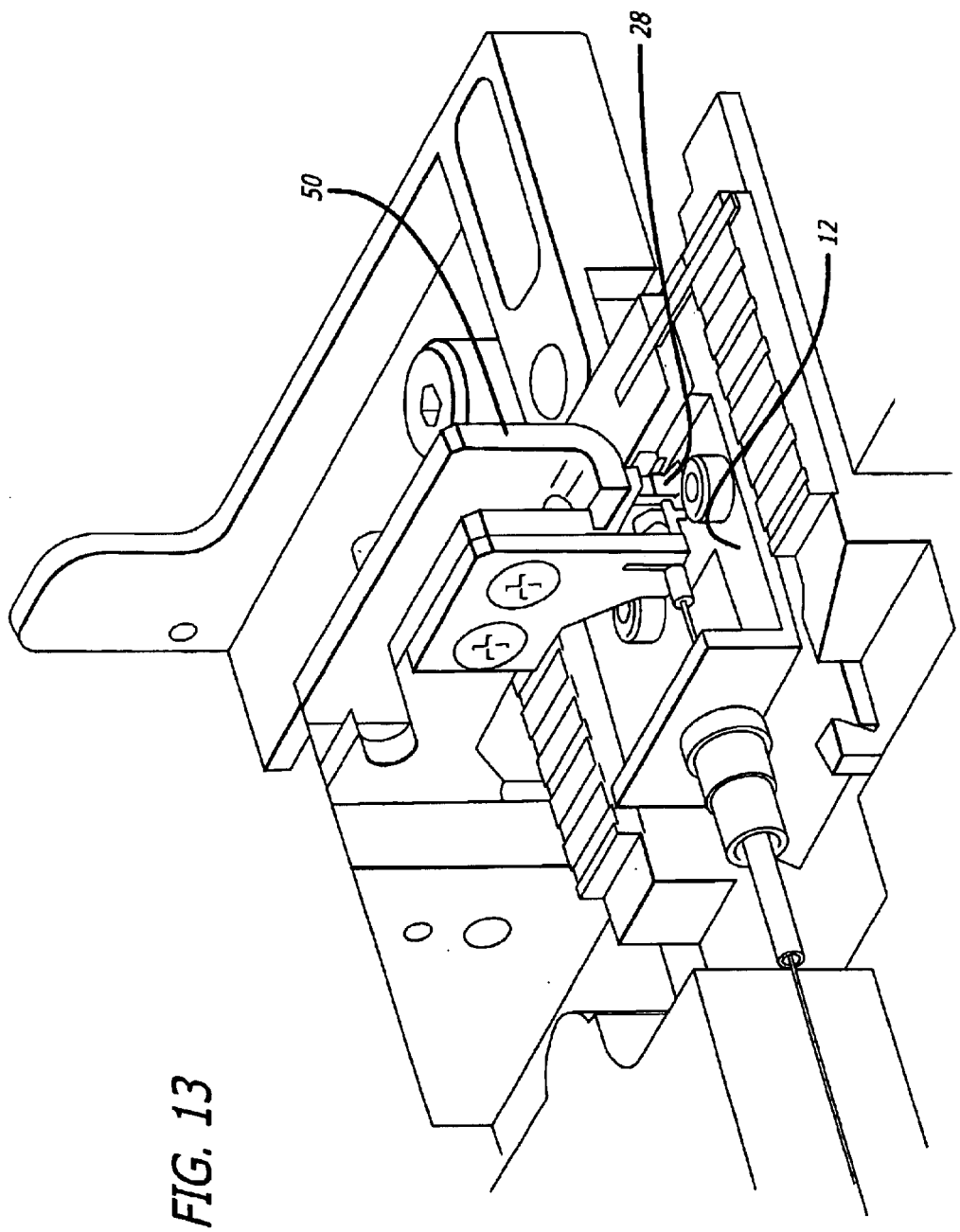
FIG. 13 is a side top perspective view of the pallet assembly with a clip loaded onto a module housing.

The pallet assembly 10 can then be removed from the loading station 80. As shown in FIG. 13, the clip 28 may be placed onto the housing 12. The clip arm 50 may then be manually rotated to secure the clip 28.

Figure 14:
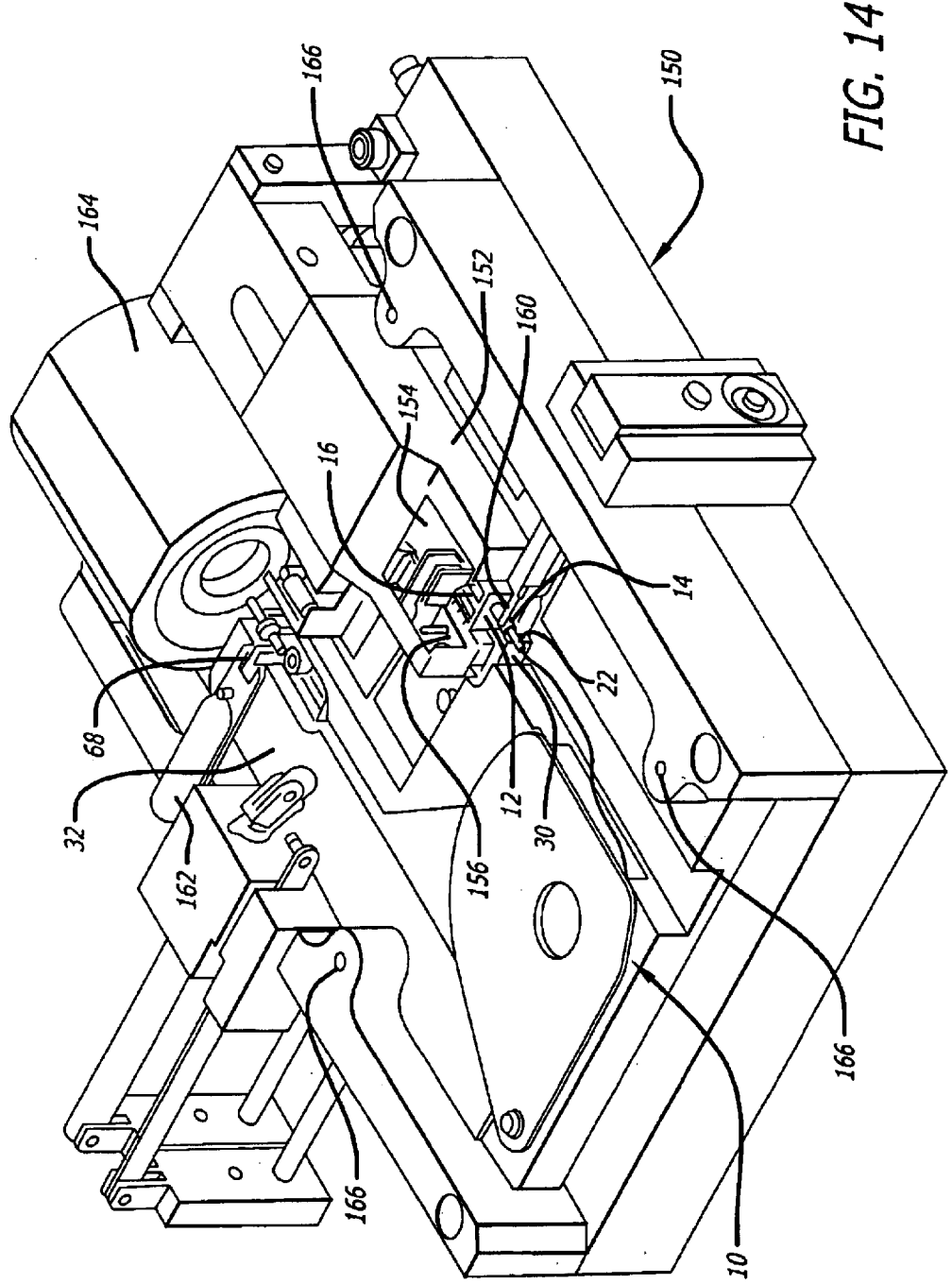
FIG. 14 is a side top perspective view of the pallet assembly loaded into a docking station of a laser weld machine.

As shown in FIG. 14, the loaded pallet assembly 10 may then be inserted into a docking station 150 of a laser weld machine. The docking station 150 may include a weld enclosure 152 that can be rotated onto the cartridge 30. The weld enclosure 152 may have a window 154 that allows one or more laser beams to weld the ferrule 24 and the clip 28. The enclosure 152 may be filled with an inert gas to facilitate the welding process.

Figure 15:
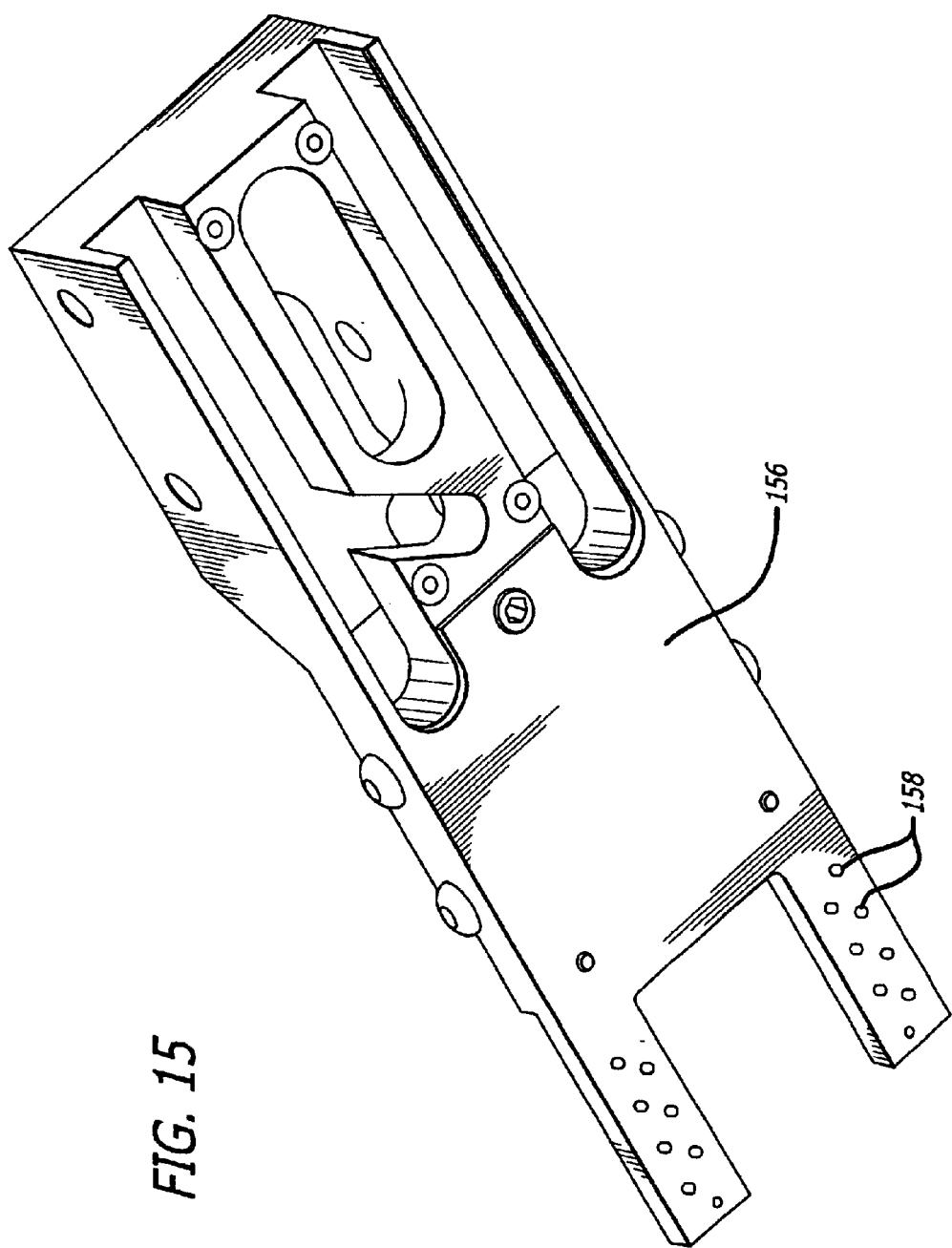
FIG. 15 is a bottom perspective view of an electrical connector of the docking station.

The enclosure 152 may include an electrical connector 156 that can be coupled to the leads 16 of the housing 12. As shown in FIG. 15, the electrical connector 156 may have a plurality of spring biased pins 158 that make contact with the leads 16. The connector 156 provides a means for creating simultaneous contact with all of the leads 16 of the housing 12. The connector 156 is coupled to a tester circuit (not shown) used to align the fiber with an optical transmitter/receiver (not shown) mounted to the housing 12.

Referring to FIG. 14, the docking station 150 may further have an inductive bar 160 that can be coupled to the housing snout 14. A solder pre-form (not shown) is typically coupled to the ferrule 22 and snout 14. The inductive bar 160 applies heat to the housing snout 14 to melt the pre-form and solder the ferrule 22 to the snout 14.

The docking station 150 may further have an actuator 162 that can move the shuttle 68 along the pallet 32. The actuator 162 can move the connector 26 into closer proximity with an optical detector 164 used to align the fiber with the transmitter/receiver. The docking station 150 may further have alignment pins 166 that align the pallet assembly 10 within the station 150.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, although the ferrule arm 48 and clip arm 50 are described as being manually actuated, it is to be understood that the arms 48 and 50 may be rotated by an actuator. Likewise, the locking arm 118 and translation of the gripper assembly 84 along the rail 106 may be automated.

What is claimed is:

1. A pallet assembly for assembling a fiber optic module that includes a housing and a plurality of leads, comprising:
   a pallet; and,
   a detachable cartridge that is attached to said pallet and supports the fiber optic module housing, said detachable cartridge having a pair of ledges of that support the leads.

2. The assembly of claim 1, further comprising a ferrule arm coupled to said detachable cartridge.

3. The assembly of claim 1, further comprising a clip arm coupled to said detachable cartridge.

4. The assembly of claim 1, further comprising a swing arm that pushes the fiber optic module housing into a stop of said detachable cartridge.

5. The assembly of claim 4, wherein said stop has a tapered surface.

6. The assembly of claim 1, further comprising a fiber connector shuttle that is adapted to hold a fiber optic cable connector and move relative to said pallet.

7. The assembly of claim 1, wherein said pallet includes a fiber optic cable channel.

8. The assembly of claim 1, wherein said pallet includes a fiber optic cable pocket.

9. The assembly of claim 8, wherein said pallet includes a cover that can enclose said fiber optic cable pocket.

10. A pallet assembly for assembling a fiber optic module that includes a housing, a ferrule and a clip, comprising:
    a pallet; and,
    cartridge means for coupling the fiber optic module housing to said pallet.

11. The assembly of claim 10, further comprising ferrule means for securing the ferrule.

12. The assembly of claim 10, further comprising clip means for securing the clip.

13. The assembly of claim 10, further comprising biasing means for biasing the fiber optic module housing into a stop of said cartridge means.

14. The assembly of claim 13, wherein said stop has a tapered surface.

15. The assembly of claim 10, further comprising shuttle means for allowing movement of a fiber optic cable connector relative to said pallet.

16. The assembly of claim 10, wherein said pallet includes a fiber optic cable channel.

17. The assembly of claim 10, wherein said pallet includes a fiber optic cable pocket.

18. The assembly of claim 17, wherein said pallet includes a cover that can enclose said fiber optic cable pocket.

19. A pallet assembly for assembling a fiber optic module that includes a housing, a ferrule and a clip, a comprising:
    a pallet that supports the housing;
    a ferrule arm that is attached to said pallet and secures the ferrule;
    a clip arm that is attached to said pallet and secures the clip;

a cartridge that supports the housing and is attached to said pallet, said cartridge having a stop; and, a swing arm that pushes the fiber optic module housing into said stop of said cartridge.

20. The assembly of claim 19, wherein said stop and swing arm have angled contact surfaces.

21. The assembly of claim 19, further comprising a connector shuttle that is adapted to hold a fiber optic cable connector and move relative to said pallet.

22. The assembly of claim 19, wherein said pallet includes a fiber optic cable channel.

23. The assembly of claim 19, wherein said pallet includes a fiber optic cable pocket.

24. The assembly of claim 23, wherein said pallet includes a cover that can enclose said fiber optic cable pocket.

25. A pallet assembly for assembling a fiber optic module that includes a housing, a ferrule and a clip, comprising:

a pallet that supports the housing;

ferrule means for securing the ferrule;

clip means for securing the clip;

cartridge means for coupling the housing to said pallet; and, bias means for biasing the fiber optic module housing into a stop of said cartridge means.

26. The assembly of claim 25, wherein said stop has an angled contact surface.

27. The assembly of claim 25, further comprising shuttle means for allowing movement of a fiber optic cable connector relative to said pallet.

28. The assembly of claim 25, wherein said pallet includes a fiber optic cable channel.

29. The assembly of claim 25, wherein said pallet includes a fiber optic cable pocket.

30. The assembly of claim 29, wherein said pallet includes a cover that can enclose said fiber optic cable pocket.

31. A pallet assembly for assembling a fiber optic module that includes a housing, comprising:

a pallet; and, a cartridge that is attached to said pallet and supports the housing, said cartridge having a stop; and, a swing arm that is mounted to said pallet.

32. The assembly of claim 31, wherein said stop and swing arm have angled contact surfaces.

33. The assembly of claim 31, further comprising a connector shuttle that is adapted to hold a fiber optic cable connector and move relative to said pallet.

34. The assembly of claim 31, wherein said pallet includes a fiber optic cable channel.

35. The assembly of claim 31, wherein said pallet includes a fiber optic cable pocket.

36. The assembly of claim 35, wherein said pallet includes a cover that can enclose said fiber optic cable pocket.

37. A pallet assembly for assembling a fiber optic module that includes a housing, comprising:

a pallet;

a cartridge that is attached to said pallet and supports the housing, said cartridge having a stop; and, bias means for pushing the housing into said stop.

38. The assembly of claim 37, wherein said stop and said bias means have angled contact surfaces.

39. The assembly of claim 37, further comprising shuttle means for allowing movement of a fiber optic cable connector relative to said pallet.

40. The assembly of claim 37, wherein said pallet includes a fiber optic cable channel.

41. The assembly of claim 37, wherein said pallet includes a fiber optic cable pocket.

42. The assembly of claim 41, wherein said pallet includes a cover that can enclose said fiber optic cable pocket.

* * * * *